United States Patent [19]

Hogan

[11] Patent Number: 4,680,831
[45] Date of Patent: Jul. 21, 1987

[54] POWER TOOL DEVICE

[76] Inventor: Timothy Hogan, 154 Kingsdale Rd., Suffolk, Va. 23434

[21] Appl. No.: 760,591

[22] Filed: Jul. 30, 1985

[51] Int. Cl.⁴ ............................................. A22B 5/20
[52] U.S. Cl. ......................................... 17/23; 30/392
[58] Field of Search ........................ 30/392, 393, 394; 17/23

[56] References Cited

U.S. PATENT DOCUMENTS 3,270,369  9/1966  Mandell ................................. 17/23
3,549,844 12/1970  Chambers .
3,886,658  6/1975  Wikoff ................................. 17/23 X
4,131,622  6/1977  Alexander ............................. 30/392
4,453,032  6/1984  Rumpp et al. .

Primary Examiner—Willie G. Abercrombie
Attorney, Agent, or Firm—Watson, Cole, Grindle & Watson

[57] ABSTRACT

Disclosed is a power tool device comprising a motor capable of driving a tool, a tool operatively connected to the motor, and a handgrip containing a switch for actuating the motor. The switch comprises two electrical contacts biased from contacting each other. Two handgrip has a switch chamber which contains the switch and has an opening on the exterior of the handgrip of sufficient size to remove the switch. A releasable cover plate is provided for closing the opening of the switch chamber. The device further includes a trigger pivotally mounted in a slot in the handgrip, the trigger including an actuator contacting the switch and capable of closing the electrical contacts by mechanical pressure.

1 Claim, 5 Drawing Figures

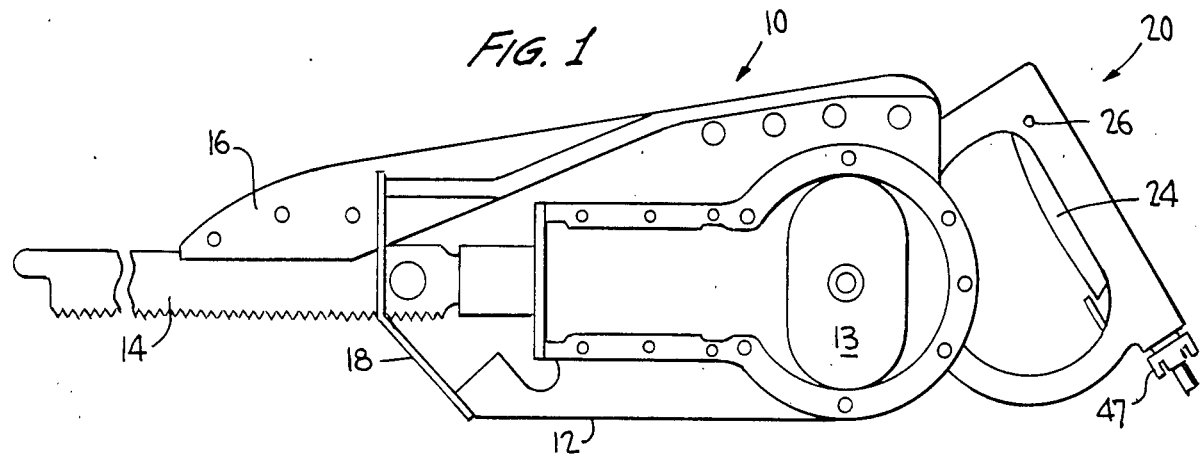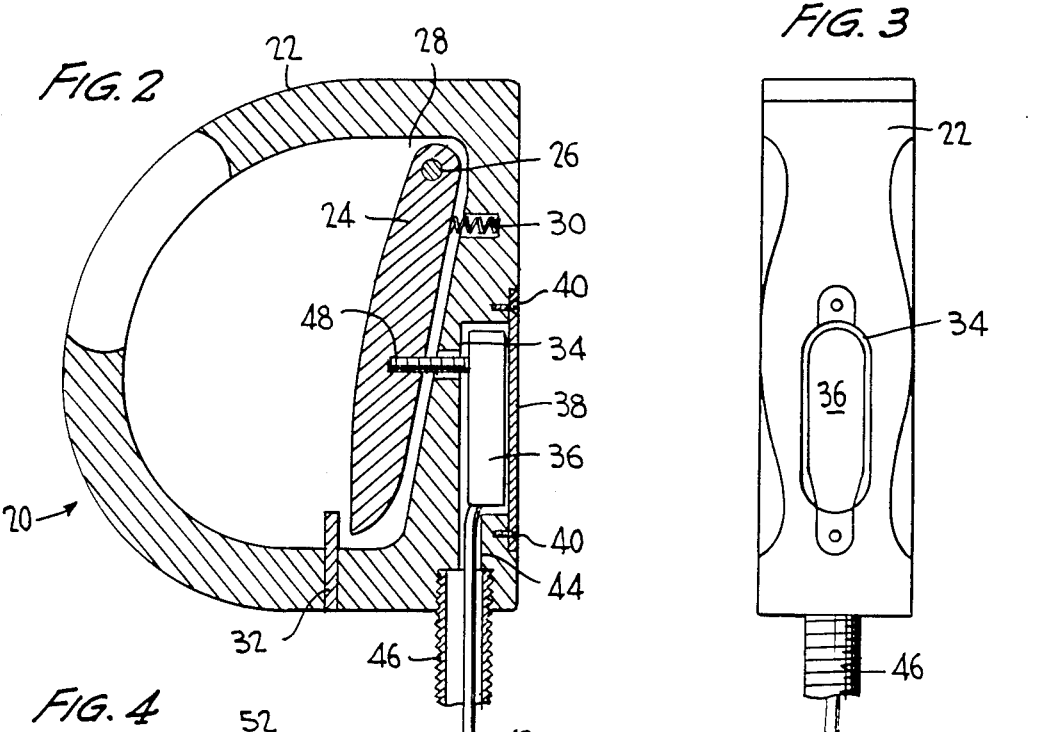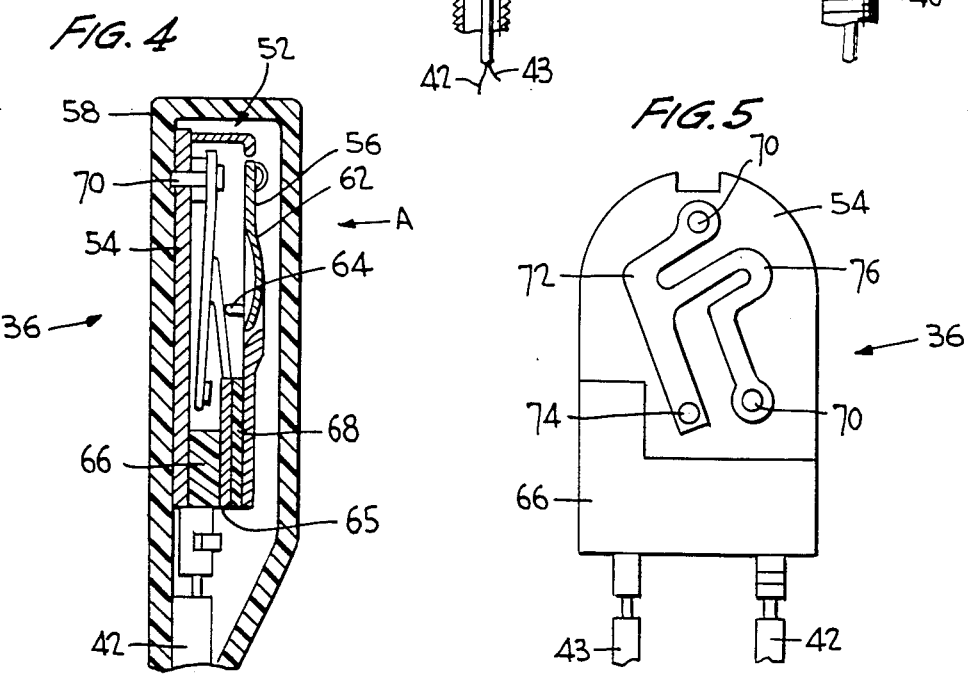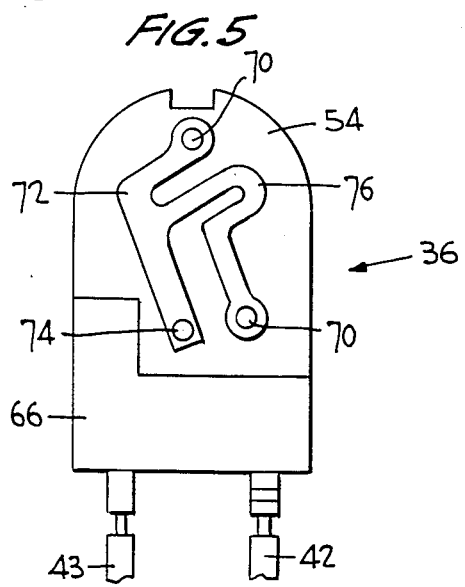

POWER TOOL DEVICE

The present invention relates generally to power tool devices and, more particularly, to power tool devices having a handgrip type handle with a trigger-type switch for actuating the tool device.

While the present invention is discussed herein primarily with reference to a brisket saw of the type commonly used in meat industry, it should be understood that the invention is not thereby so limited.

BACKGROUND OF THE INVENTION

In the meat or packing industry, it is common practice for workers to utilize various power driven tools in cutting the carcass of an animal into suitable sized portions. Generally, these tools have an operator-actuated switch for energizing the tool, the switch being conveniently located in a handgrip for the tool so the operator can simultaneously actuate and guide the tool with one hand.

A conventional type handgrip with switch for a reciprocating blade type tool is illustrated and disclosed in U.S. Pat. No. 3,270,369 to Mandell. As is set forth therein, the handle portion comprises a grip portion and a trigger, the grip portion having reed type switch inserted within. The reed type switch comprises a glass tube with metallic reed elements mounted inside the tube. The glass tube is mounted within a metallic tube and is separated from the sides of the tube by a plastic filler or a suitable filling compound. A plug having two lead wires has one of its wires connected to the metallic tube and the other wire to one of the metallic reed elements, the other reed element being connected to the metallic tube. The switch is operated by squeezing the trigger and a permanent magnet attached to the trigger causes the reed elements to contact each other and complete the electrical circuit.

A problem encountered with such saws is that, due to the vibration created by the saw blade, the reed switch oftentimes breaks or cracks and becomes inoperative so that the switch must be replaced. Another problem is that the removal of a defective reed type switch and replacement with a new switch is tedious and time consuming since the fittings holding the switch must be released and the entire switch including lead wires withdrawn from the handgrip.

SUMMARY OF THE INVENTION

It is therefore a feature of the invention to provide a handgrip for a power tool device which contains a switch which is less prone to breakage than a reed type switch.

It is another feature of the present invention to provide a handgrip containing a switch for use in a power tool device which enables the switch to be easily replaced.

Briefly, the present invention comprehends a power tool device comprising a motor capable of driving a tool, a tool operatively connected to the motor and a handgrip containing a switch for actuating the motor, the switch comprising two electrical contacts biased from contacting each other, the handgrip having a switch chamber which contains the switch and has an opening on the exterior of the handgrip of a size sufficient to remove the switch, a releasable cover plate closing the opening of the switch chamber, and a trigger pivotally mounted in a slot in the handgrip, the trigger including an actuator contacting the switch and capable of closing the electrical contacts by mechanical pressure.

Further objects, advantages and features of the present invention will become more fully apparent from a detailed consideration of the arrangement and construction of the constituent parts as set forth in the following description taken together with the accompanying drawing.

BRIEF DESCRIPTION OF THE DRAWING

In the drawing,

FIG. 1 is a side view of one embodiment of an electrical tool device according to the invention, FIG. 2 is a cross-sectional view of the handgrip portion of the tool device of FIG. 1, the view being taken along line 2—2, FIG. 3 is an end view of the handgrip portion of the tool device showing the switch and switch chamber, FIG. 4 is a cross-sectional view of a switch which may be used in the tool device of the present invention, and FIG. 5 is a top plan view of the switch of FIG. 4, the insulation and cover portion of the housing having been removed for the sake of clarity.

DETAILED DESCRIPTION OF THE PREFERRED EMBODIMENTS

Referring now to FIG. 1, shown is a brisket saw 10 including a handle according to the present invention. Saw 10 comprises housing 12 with attached motor 13 and with saw blade 14 projecting therefrom. Contained within housing 12 are transmission components (not shown) which convert the rotary motion of motor 13 into reciprocable movement for driving blade 14. Motor 13 may be of the hydraulic or electric type. Guard 16 and guide 18 are attached to housing 12 to protect and guide blade 14. The above-described components of saw 10 are of conventional construction and thus will not be described in any further detail.

Mounted on the end of housing 12 opposite from blade 14 is handle 20 which provides for selective actuation of saw 10 by an operator. As is best shown in FIG. 2, handle 20 comprises handgrip 22 having trigger 24 pivotally mounted by pin 26 within slot 28. Trigger 24 is biased by spring 30 such that the distal end of the trigger contacts stop 32 projecting upwardly in the inner portion of handgrip 22.

Formed within handgrip 22 adjacent to trigger 24 is switch chamber 34 of a hexahedron type configuration which contains electrical switch 36. Switch chamber 34 is closed by cover plate 38 removably attached to grip 22 by a pair of screws 40. Electrical wires 42 and 43 extend from switch 36 and exit grip 22 through aperture 44 and fitting 46. Fitting 46 provides a mounting means for a suitable cap 47 (see FIG. 1) which clamps and retains wires 42 and 43. Switch actuator 48 is held within bore 50 in trigger 24 and extends through grip 22 such that it is able to mechanically contact switch 36.

FIG. 3 shows the contoured shape of the portion of handgrip 22 which contacts the hand of an operator as well as the shape of the switch chamber 34. In this view, cover plate 38 has been removed and switch 36 is thus visible. Preferably, switch chamber 34 is formed such that the surfaces containing the threaded holes for screws 40 are recessed a distance equal to the thickness of cover plate 38 such that, when mounted, the external surface of the plate is flush or even with the exterior of handgrip 22.

When it is desired to actuate saw 10, the operator squeezes trigger 24 which forces actuator 48 against switch 36 thereby completing an electrical circuit (not shown) which starts motor 13. Preferably, switch 36 is of the type shown in FIGS. 4 and 5 which is a snap type switch where the electric contacts are biased to the open position and thus an electrical circuit is completed only as long as mechanical pressure by the actuator is maintained against the one of the switch contacts.

Switch 36 is of a known construction conventionally used in TIG type welding machines. Switch 36 comprises a metallic switch housing 52 including planar base portion 54 and cover portion 56, the housing being surrounded by electrically insulating flexible sheathing 58. Cover portion 56 of switch housing 52 carries hinged, dome-shaped member 62 in an opening in the cover portion, the hinged member having arm 64 projecting into the interior of the switch housing. One electrical lead wire 42 of switch 36 is connected to base portion 54 and the other lead wire 43 is connected to first contact 65 which is spaced from housing 52 by electrically insulating plates 66 and 68. Staked to base portion 54 by rivets 70 is spring-like second contact 72 having contact point 74. As is best shown in FIG. 5, second contact 72 is of complex shape and is mounted on base portion 54 of switch housing 52 such that the bight-shaped portion 76 is biased higher relative to the base portion than contact point 74.

To actuate switch 36, pressure applied by trigger 24 and associated actuator 48 in the direction of arrow A moves hinged member 62 inwardly such that arm 64 contacts bight portion 76 of second contact 72. The pressure applied by arm 64 causes contact 72 to rotate about an axis between rivets 70 thereby causing contact point 74 to move toward and strike first contact 65 and complete the electrical circuit.

As is apparent from the foregoing, the handle of the present invention, by providing a switch chamber with removable cover, enables a repairman to replace a defective switch very easily. More specifically, the switch can be replaced simply by removing the switch chamber cover, disconnecting the lead wires, and reconnecting the lead wires to a new switch. Furthermore, the switch utilized can be of a relatively inexpensive type.

While there has been shown and described what is considered to be a preferred embodiment of the present invention, it will be obvious to those skilled in the art that various changes and modifications may be made therein without departing from the invention as defined in the appended claims.

It is claimed:

1. A power tool device comprising a housing, a rotary motor within the housing which is capable of driving a reciprocating type saw blade, a reciprocable saw blade operatively connected to the motor and extending from the housing, a hardgrip having a contoured exterior which extends from the housing opposite from the blade, the handgrip being generally in the shape of a D with one straight portion and curved portion attached to the ends of the straight portion, the handgrip containing a snap type switch for actuating the motor and thus reciprocating the saw blade, the switch comprising first and second electrical contacts which are biased away from contacting each other, and a metallic switch housing containing the contacts, the switch housing being surrounding by electrically insulating flexible sheathing and including a planar base portion and a cover portion including a hinged dome-shaped member having an arm which under applied mechanical pressure is capable of moving the second electrical contact into electrical contact with the first contact, the second contact being of a complex shape having a bight-shaped portion and having a contact point, the second contact being mounted on the base portion of the housing such that the bight-shaped portion is biased higher relative to the base portion than the contact point, the handgrip having a switch chamber which contains the switch and has an opening on the exterior of the handgrip of sufficient size to remove the switch, the switch chamber being within the straight portion of the handgrip, a cover plate closing the opening of the switch chamber and removably attached to the handgrip by screws, the switch chamber being formed such that its surfaces containing threaded holes for the screws are recessed a distance equal to the thickness of the cover plate such that the external surface of the cover plate is flush with the exterior of the handgrip, electrical wires extending from the switch through an aperture in the handgrip and secured thereto by a cooperating fitting and cap, and a trigger pivotally mounted by a pin within a slot in the handgrip, the trigger biased by a spring and including an actuator contacting the switch and capable of closing the electrical contacts by a mechanical pressure.

* * * * *